United States Patent
Beall et al.

(10) Patent No.: US 7,254,297 B1
(45) Date of Patent: Aug. 7, 2007

(54) ATHERMAL OPTICAL DEVICES EMPLOYING NEGATIVE EXPANSION SUBSTRATES

(75) Inventors: George H. Beall, Big Flats, NY (US); David L. Weidman, Corning, NY (US)

(73) Assignee: Corning Incorporated, Corning, NY (US)

( * ) Notice: Subject to any disclaimer, the term of this patent is extended or adjusted under 35 U.S.C. 154(b) by 283 days.

(21) Appl. No.: 09/203,166

(22) Filed: Dec. 1, 1998

Related U.S. Application Data

(63) Continuation of application No. 09/101,630, filed as application No. PCT/US96/13062 on Aug. 7, 1996.

(60) Provisional application No. 60/010,058, filed on Jan. 16, 1996.

(51) Int. Cl.
G02B 6/26 (2006.01)

(52) U.S. Cl. ............................. 385/37; 385/31; 385/39

(58) Field of Classification Search ................ 385/37, 385/123, 31, 95–99, 147, 39
See application file for complete search history.

(56) References Cited

U.S. PATENT DOCUMENTS

| | | | |
|---|---|---|---|
| 3,617,317 A | 11/1971 | Sack et al. | |
| 3,812,689 A | 5/1974 | Reade | |
| 4,083,727 A | 4/1978 | Andrus et al. | |
| 4,209,229 A | 6/1980 | Rittler | |
| 4,473,653 A | 9/1984 | Rudoi | |
| 4,725,110 A | 2/1988 | Glenn et al. | |
| 4,778,242 A | 10/1988 | Ota et al. | |
| 4,814,297 A | 3/1989 | Beall et al. | |
| 4,865,414 A | 9/1989 | Ohta et al. | |
| 4,923,278 A | 5/1990 | Kashyap et al. | |
| 4,943,130 A | 7/1990 | Dannoux et al. | |
| 5,042,898 A | 8/1991 | Morey et al. | |
| 5,123,070 A | 6/1992 | Bradley | |
| 5,186,729 A | 2/1993 | Brown et al. | |
| 5,322,559 A | 6/1994 | Sleight | |
| 5,336,643 A | 8/1994 | Goto et al. | |

(Continued)

FOREIGN PATENT DOCUMENTS

GB 940706 10/1963

(Continued)

OTHER PUBLICATIONS

Materials Chemistry and Physics, vol. 42 pp. 214-215 by Chu et al Multilayer Dielectric Materials of SiOx/Ta205/SiO2 For Temperature Stable Diode Lasers, 1995.*

(Continued)

*Primary Examiner*—Kevin S Wood
(74) *Attorney, Agent, or Firm*—Svetlana Z. Short; Maurice M. Klee

(57) ABSTRACT

An athermal optical device and a method for producing the device, such as an athermal optical fiber reflective grating, are described. The athermal optical fiber reflective grating device comprises a negative expansion substrate, an optical fiber mounted on the substrate surface, and a grating defined in the optical fiber. The method for producing the athermal optical fiber reflective grating device comprises providing a negative expansion substrate, mounting an optical fiber with at least one reflective grating defined therein onto the substrate upper surface, and affixing the optical fiber to the substrate at at least two spaced apart locations.

19 Claims, 5 Drawing Sheets

U.S. PATENT DOCUMENTS

| | | | |
|---|---|---|---|
| 5,367,589 A | * | 11/1994 | MacDonald et al. .......... 385/37 |
| 5,426,714 A | | 6/1995 | Gadkaree et al. |
| 5,433,778 A | | 7/1995 | Sleight |
| 5,514,360 A | | 5/1996 | Sleight et al. |
| 5,591,682 A | | 1/1997 | Goto |
| 5,694,503 A | | 12/1997 | Fleming et al. |

FOREIGN PATENT DOCUMENTS

| | | |
|---|---|---|
| JP | 2-183131 | 7/1990 |
| WO | WO 97/26572 | 7/1997 |
| WO | WO 97/28480 | 8/1997 |

OTHER PUBLICATIONS

Buerger, M.J., "The Stuffed Derivatives of the Silica Structures," Am. Mineral, vol. 39, 1954, pp. 610-614.

Bush et al., "High-Temperature Mechanical Properties of Ceramic Materials: ll, Beta-Eucryptite," Journal of the American Ceramic Society-Bush and Hummel, vol. 42, No. 8, Aug. 1959.

Chu et al., "Multilayer Dielectric Materials of SiOx/Ta2O5/SiO2 For Temperature Stable Diode Lasers," Materials Chemistry and Physics, vol. 42, 1995, pp. 214-215.

Gillery et al., "Thermal Contraction of β-Eucryptite ($Li_2 Al_2 O_3 2SiO_2$) by X-ray and Dilatometer Methods," Journal of the American Ceramic Society, vol. 42, No. 4, Apr. 1959, pp. 175-177.

Kokubun et al., "Three Dimensional Athermal Waveguide for Narrow-Band Optical Filter," ECOC '93, vol. 2, Sept. 12-16, 1993, pp. 429-432.

Lee et al., "In Situ-Whisker-Reinforced $AlPO_4$-Modified β-Eucryptite Glass-Ceramic: I, Morphology and Crystallization Kinetics," Journal of the American Ceramic Society, 79(3), 1996, pp. 597-602.

Levin et al., Fig 449, Phase Diagrams for Ceramists, The American Ceramic Society, Columbus, Ohio, 1964, p. 166.

Martinek et al., "Linear Thermal Expansion of Three Tungstates," Journal of the American Ceramic Society-Discussions and Notes, Apr. 1968, vol. 51, No. 4, pp. 227-228.

Palmer, D.C., "Stuffed Derivatives of the Silica Polymorphs," *Physical Behaviors, Geochemistry, and Material Applications*, ed. by P.J. Heaney et al., Reviews in Mineralogy, 29, 83-122, Mineralogical Society of America, Washington D.C., 1994.

Roy et al., "The System Lithium Metasilicate-Spodumene-Silica," J. Am. Cer. Soc., 1949, vol. 71, pp. 2086-2095.

Yoffe et al., "Passive Temperature-Compensating Package for Optical Fiber Gratins," Applied Optics, Oct. 20, 1995, vol. 34, No. 30, pp. 6859-6861.

Yoffe et al., "Temperature Compensated Optical Fiber Bragg Gratings," Optical Fiber Communicatin, OFC'95 Technical Digest, vol. 8, Feb. 26, 1995-Mar. 3, 1995, pp. 134-135.

G. H. Beall, "Industrial Applications of Silica," *Silica, Physical Behavior, Geochemistry, and Materials Applications*, ed. by P. J. Heaney, C.T. Prewitt and G.V. Gibbs, vol. 29, Reviews in Minerology, Mineralogical Society of America, Washington, DC, pp. 469-505, 1994.

* cited by examiner

ATHERMAL OPTICAL DEVICES EMPLOYING NEGATIVE EXPANSION SUBSTRATES

CROSS REFERENCE TO RELATED APPLICATIONS

This is a continuation of U.S. application No. 09/101,630 filed on Jul. 14, 1998, which is the U.S. national phase filing of PCT/US96/13062 filed on Aug. 7, 1996, which claims the benefit under 35 USC §119(e) of U.S. Provisional Application No. 60/010,058, filed on Jan. 16, 1996, the contents of each of which in their entireties are hereby incorporated by reference.

FIELD OF THE INVENTION

This invention relates to a temperature compensated, athermal optical device and, in particular, to an optical fiber reflective grating device incorporating a negative expansion beta-eucryptite substrate to produce an athermal optical fiber reflective grating device, and to a method of producing the athermal optical fiber reflective grating device.

BACKGROUND OF THE INVENTION

Index of refraction changes induced by UV light are useful in producing complex, narrow-band optical components such as filters and channel add/drop devices. These devices can be an important part of multiple-wavelength telecommunication systems. The prototypical photosensitive device is a reflective grating (or Bragg grating), which reflects light over a narrow wavelength band. Typically, these devices have channel spacings measured in nanometers.

There are already known various constructions of optical filters, among them such which utilize the Bragg effect for wavelength selective filtering. U.S. Pat. No. 4,725,110 discloses one method for constructing a filter which involves imprinting at least one periodic grating in the core of the optical fiber by exposing the core through the cladding to the interference pattern of two ultraviolet beams that are directed against the optical fiber at two angles relative to the fiber axis that complement each other to 180°. This results in a reflective grating which is oriented normal to the fiber axis. The frequency of the light reflected by such an optical fiber with the incorporated grating filter is related to the spacing of the grating which varies either with the strain to which the grating region is subjected, or with the temperature of the grating region, in a clearly defined relationship, which is substantially linear to either one of these parameters.

For a uniform grating with spacing L, in a fiber with an effective index of refraction n and expansion a, the variation of center reflective wavelength, $l_r$ is given by $$dl_r/dT = 2L[dn/dT + na]$$

In silica and germania-silica fiber reflective gratings the variation in center wavelength is dominated by the first term in the brackets, the change of index of refraction with temperature. The expansion term contributes less than ten percent of the total variability $dl_r/dT$ is typically 0.01 nm/° C. for a grating with a peak reflectance at 1550 nm.

One practical difficulty in the use of these gratings is their variation with temperature. In as much as the frequency of the light reflected by the fiber grating varies with the temperature of the grating region this basic filter cannot be used in applications where the reflected light frequency is to be independent of temperature. Methods of athermalizing the fiber reflective grating would increase the applications for such gratings.

One method of athermalizing a fiber reflective grating is to thermally control the environment of the grating with an actively controlled thermal stabilization system. Such thermal stabilization is costly to implement and power, and its complexity leads to reliability concerns.

A second athermalization approach is to create a negative expansion which compensates the dn/dT. Devices which employ materials with dissimilar positive thermal expansions to achieve the required negative expansion are known.

U.S. Pat. No. 5,042,898 discloses a temperature compensated, embedded grating, optical waveguide light filtering device having an optical fiber grating. Each end of the fiber is attached to a different one of two compensating members made of materials with such coefficients of thermal expansion relative to one another and to that of the fiber material as to apply to the fiber longitudinal strains, the magnitude of which varies with temperature in such a manner that the changes in the longitudinal strains substantially compensate for these attributable to the changes in the temperature of the grating.

Yoffe, G. W. et al in "Temperature-Compensated Optical-Fiber Bragg Gratings" OFC'95 Technical Digest, paper WI4, discloses a device with a mechanical arrangement of metals with dissimilar thermal expansions which causes the distance between the mounting points of an optical fiber to decrease as the temperature rises and reduce the strain in a grating.

Such devices have several undesirable properties. First, fabricating a reliable union with the fiber is difficult in such devices. Second, the mechanical assembly and adjustment of such devices make them costly to fabricate. These systems also show hysteresis, which makes the performance degrade under repeated thermal cycling. Finally some of the approaches require that the grating, which can be several centimeters long, be suspended, making them incompatible with other requirements of passive devices such as insensitivity to mechanical shock and vibration.

Another method of incorporating negative expansion which may be envisaged is to provide a substrate for mounting the optical fiber grating thereon which is fabricated from material with an intrinsic negative coefficient of expansion.

U.S. Pat. No. 4,209,229 discloses lithium-alumina-silica type ceramic glasses, particularly those having stoichiometries, on a mole ratio basis, in the range of 1 $Li_2O$:0.5-1.5 $Al_2O_3$: 3.0-4.5 $SiO_2$, which are particularly adapted for use as protective outer layers over fused silicas and other cladding materials for optical fiber waveguide members. When these lithium aluminosilicate glasses are cerammed, that is, heat treated to produce nucleated crystallizations, the dominant crystal phase developed is either beta-eucryptite or beta-quartz solid solution. Nucleating agents such as $TiO_2$ and $ZrO_2$ are used to initiate crystallization of the glass. The glasses produced in this manner have negative coefficients of expansion averaging about $-1.4 \times 10^{-7}/°$ C. over the range of 0°-600° C. Thin layers of these lithium aluminosilicate glasses can be cerammed to develop fine-grained crystal phases by heat treating a coated filament at 700-1400° C. for a time not exceeding one minute. The cooled outer layer exerts a compressive stress on the coated fiber.

U.S. Pat. No. 5,426,714 disclose optical fiber couplers which utilize beta-eucryptite lithium aluminosilicates having a low or negative coefficient of thermal expansion as fillers for polymeric resins. The glass-ceramics were obtained by melting the composition in a platinum crucible at 1650° C. The glass was then drigaged, cerammed and ground to a powder. A beta-eucryptite composition of 15.56 wt. % $Li_2O$, 53.125 wt. % $Al_2O_3$, 31.305 wt. % $SiO_2$ having a negative coefficient of thermal expansion of $-86¥10^{-7}/°$ C. measured between $-40°$ C. and $+80°$ C. is disclosed (Col. 4, lines 24-28).

It is an object of this invention to provide a temperature compensated optical device which is an athermal device.

It is an object of this invention to provide a temperature compensated optical fiber reflective grating device which is an athermal device.

It is an object of this invention to provide a temperature compensated optical fiber reflective grating device which tolerates shock and vibration.

It is an object of this invention to provide a temperature compensated optical fiber reflective grating device which has a stable center wavelength.

It is an object of this invention to provide a temperature compensated optical fiber reflective grating device in which the grating region of the fiber is straight.

SUMMARY OF THE INVENTION

Briefly stated the invention provides a method for producing an athermal optical device comprising; providing a negative expansion substrate having an upper surface; mounting a thermally sensitive, positive expansion optical component onto the substrate upper surface and affixing the component to the substrate at at least two spaced apart locations.

In another aspect of the invention there is provided an athermal optical device comprising; a negative expansion substrate having an upper surface; a thermally sensitive, positive expansion optical component affixed to the substrate upper surface at at least two spaced apart locations.

In another aspect of the invention there is provided a method for producing an athermal optical fiber grating device comprising; providing a negative expansion substrate having an upper surface and first and second ends; mounting an optical fiber with at least one grating defined therein onto the substrate upper surface such that the grating lies between and at a distance from each end; and affixing the optical fiber to the substrate at at least two spaced apart locations.

In another aspect of the invention there is provided an athermal optical fiber grating device comprising; a negative expansion substrate having an upper surface and first and second ends; an optical fiber affixed to the substrate upper surface at at least two spaced apart locations; and a grating defined in the optical fiber between and at a distance from each end.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Figure 1:
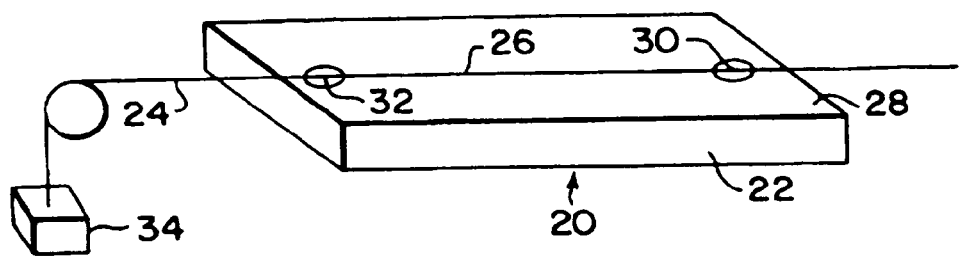
FIG. 1 is a schematic drawing of an embodiment of an athermal optical fiber grating device.

Thermally sensitive optical devices of the invention include optical waveguides, UV photo induced fiber gratings and optical fiber couplers. The optical fiber reflective gratings used in the device of this invention are well known to those familiar with the art, for example, UV photo induced gratings of the Bragg type.

In this invention, the athermalization approach taken is to create a negative expansion which compensates for the positive change in refractive index of the optical fiber with a change in temperature. The coefficient of expansion required is on the order of $-50¥10^{-7}/°$ C., or perhaps slightly higher because of stress-optic effects. In this approach, the fiber containing the grating is mounted, preferably under tension, on a substrate that imparts a negative thermal expansion to the fiber. Thus, as the temperature is increased, the tension is reduced, but the fiber is never put into compression (as this would be mechanically unstable).

The optical fiber, for example a germania-silica fiber, is affixed to a substrate with an intrinsic negative coefficient of expansion. The increase of the index of refraction of the fiber caused mostly by the thermal drift, is compensated by a negative mechanical expansion. The negative expansion is imparted by a substrate fabricated from a material based on a silica based glass-ceramic possessing an intrinsic negative coefficient of expansion. The negative expansion is obtained by inducing micro crystals in the glass-ceramic which undergo a reconstructive phase change on heating at high temperatures, for example about 1300° C., to produce a highly ordered beta-eucryptite (i.e. stuffed beta-quartz) structure.

A suitable material for the substrate, beta-eucryptite, has been identified which provides compensation over a wide temperature range, for example $-40°$ to $+85°$ C., which is mechanically robust against creep and shows minimal thermal hysteresis. In some applications an even wider range of temperatures may be tolerated. The beta-eucryptite material is based on a highly ordered lithium aluminosilicate glass-ceramic which is, in itself, a stuffed derivative of beta-quartz containing aluminum and lithium. Significant titania, for example >2 wt %, is also required to be present as a nucleating agent to induce crystallization of the solid solution in order to minimize grain size and reduce hysteresis due to inter granular micro cracking.

The beta-eucryptite solid solution of preference lies between stoichiometric $LiAlSiO_4$ ($Li_2O:Al_2O_3:2SiO_2=1:1:2$) and $Li_2Al_2Si_3O_{10}$ ($Li_2O:Al_2O_3:3SiO_2=1:1:3$), and the nucleating agents $TiO_2$ and, optionally, $ZrO_2$, are added in such a way as to produce accessory phases $Al_2TiO_5$ or $ZrTiO_4$, preferably the former, for the lowest thermal expansion coefficients.

This glass-ceramic has a true negative expansion micro crystalline phase, strongly along one axis, c-axis, mildly positive along the other, a-axis and is mechanically stable over a wide temperature range, showing little hysteresis or physical property degradation.

In weight percent, a suitable glass-ceramic composition range is as follows: $SiO_2$ 43-55%, $Al_2O_3$ 31-42%, $Li_2O$ 8-11%, $TiO_2$ 2-6%, and $ZrO_4$ 0-4%.

The beta-eucryptite substrate of the invention is preferably a material with a coefficient of thermal expansion between $-30 \times 10^{-7}/°C$. and $-90 \times 10^{-7}/°C$., more preferably $-50 \times 10^{-7}/°C$. to $-75 \times 10^{-7}/°C$., even more preferably $-55 \times 10^{-7}/°C$.

In order to produce material with this degree of negative expansion the beta-eucryptite has to be very highly ordered to form alternating $AlO_4$ and $SiO_4$ tetrahedra. This is achieved by heating the crystallized phase at a top temperature near 1300° C. for at least 3 hours, preferably about 4 hours. In order to prevent cracking of the glass a thermal schedule is used which requires heating the glass through a range of temperatures which maintains a desired viscosity during crystallization near $5 \times 10^{10}$ poises thereby precluding sagging or cracking.

The beta-eucryptite materials of the prior art were not obtained in a slab form but rather were prepared as thin coatings or crushed powders. In order to produce a glass-ceramic substrate of the desired size (potentially several centimeters long) a glass of some stability is required. The molten glass must be cast into thin slabs, for example <0.5 in. thick, onto a metal table or mold to ensure rapid cooling. The glass is then annealed at about 700°-800° C. for several hours and then cooled slowly to avoid undesirable stresses.

EXAMPLES OF BETA-EUCRYPTITE COMPOSITIONS

Example 1

A composition containing on a weight percent basis 50.3% $SiO_2$, 36.7% $Al_2O_3$, 9.7% $Li_2O$ and 3.3% $TiO_2$ is melted at 1600° C. in a crucible then the glass is cast onto a cold steel plate to form a disc of about 0.25 to 0.5 in thick. The slab is then cut into bars and heated to 715° C. at 300° C./hr, to 765° C. at 140° C./hr, to 1300° C. at 300° C./hr, held at this temperature for 4 hours then cooled at the furnace cooling rate for several hours to less than about 100° C.

Figure 6:
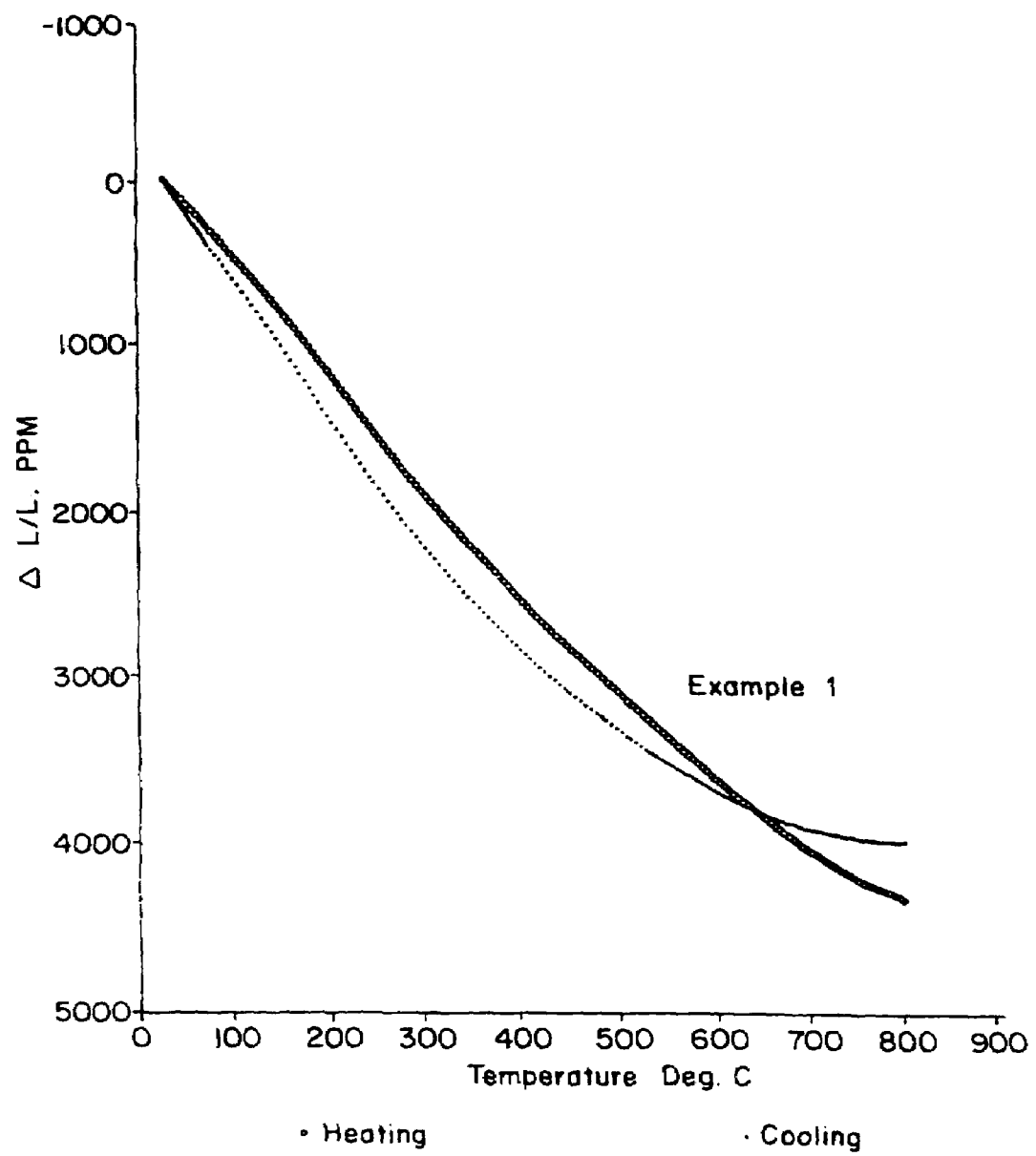
FIG. 6 is a thermal expansion graph of a beta-eucryptite glass-ceramic.

FIG. 6 shows a thermal expansion measurement on a 2 inch (50 mm) sample of the material composition of Example 1 which gives an average negative coefficient of expansion of $-78 \times 10^{-7}/°C$. (measured between 25°-150° C.) and a moderate level of hysteresis as evidenced by the very similar heating and cooling curves.

Example 2

A composition containing on a weight percent basis 49.0% $SiO_2$, 37.1% $Al_2O_3$, 9.6% $Li_2O$ and 4.3% $TiO_2$ is melted at 1600° C. in a crucible then the glass is cast onto a cold steel plate to form a disc of about 0.25 to 0.5 in (6.3 mm to 12.7 mm) thick. The slab is then cut into bars and heated to 715° C. at 300° C./hr, to 765° C. at 140° C./hr, to 1300° C. at 300° C./hr and held at this temperature for 4 hours, then cooled at the furnace cooling rate for several hours to less than about 100° C. The cooled bar is subjected to four cycles of reheating to 800° C. and cooling to ambient temperatures to minimize hysteresis.

Example 3

A composition identical to that of Example 2 was treated to the same conditions except that it is held at 1300° C. for only 0.5 hours before cooling, and it was not subjected to further heating cycles.

Figure 7:
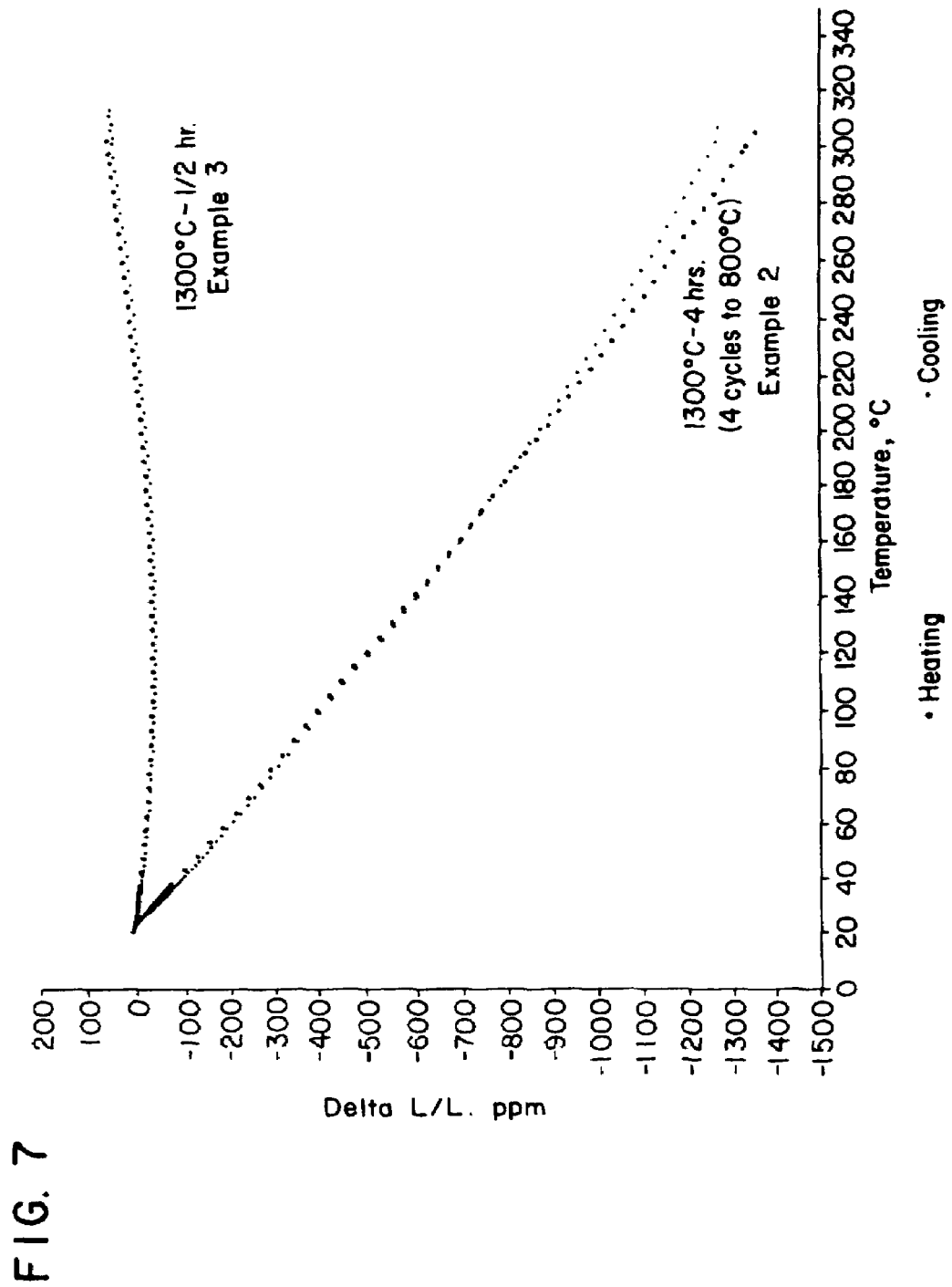
FIG. 7 is a thermal expansion graph of a beta-eucryptite glass-ceramic.

FIG. 7 shows a thermal expansion measurement on the material composition of Examples 2 and 3. Example 2 shows an average negative coefficient of expansion of $-52.8 \times 10^{-7}/°C$. (measured between 25°-150° C.) and essentially no hysteresis as evidenced by the very similar heating and cooling curves. Example 3 shows zero expansion over the same temperature range without hysteresis.

In order to obtain the desired degree of negative expansion it is preferable that the composition be maintained at the top temperature of 1300° C. for about 3 to 4 hours to obtain a highly ordered crystal phase. It is evident that the material of Example 3 which was only maintained at 1300° C. for 0.5 hour has a zero coefficient of expansion and is still relatively disordered.

The heat recycling steps are not essential for achieving satisfactory hysteresis. However, 1 to 4 heat recycling steps may be beneficial. The heating rate is about 300° C. per hour and the bar is maintained at 800° C. for about 1 hour each cycle.

Referring to FIG. 1 there is illustrated a first embodiment of the invention. The optical fiber reflective grating device 20 has a substrate 22 formed from a flat block of a negative expansion material, such as beta-eucryptite. An optical fiber 24 having at least one UV-induced reflective grating 26 written therein is mounted on the surface 28 and attached at either end of the surface at points 30 and 32. It is important that the fiber is always straight and not subject to compression as a result of the negative expansion and thus the fiber is usually mounted under tension. Before attachment the fiber is placed under a controlled tension, as shown schematically by the use of a weight 34. The proper choice of tension assures that the fiber is not under compression at all anticipated use temperatures. However, the fiber can be under tension at all anticipated use temperatures. The required degree of tension to compensate for the negative expansion in a particular application can readily be calculated by those with skill in this art.

The attachment material could be an organic polymer, for example an epoxy cement, an inorganic frit, for example ground glass, ceramic or glass-ceramic material, or a metal. In one embodiment the fiber is tacked to the substrate with a UV-cured epoxy adhesive. Mechanical means for attaching the fiber can also be used.

Generally the optical fiber reflective grating is supplied with a coating material surrounding the fiber. In the preferred packaging approach the coating in the grating region of the fiber is left intact while it is removed in the substrate attachment region at each end of the grating. However, the device can have the coating completely removed between the attachment locations. Removal of the coating can be accomplished by one of two methods: a non-contact, non-chemical stripping mechanism or by conventional chemical stripping.

Figure 2:
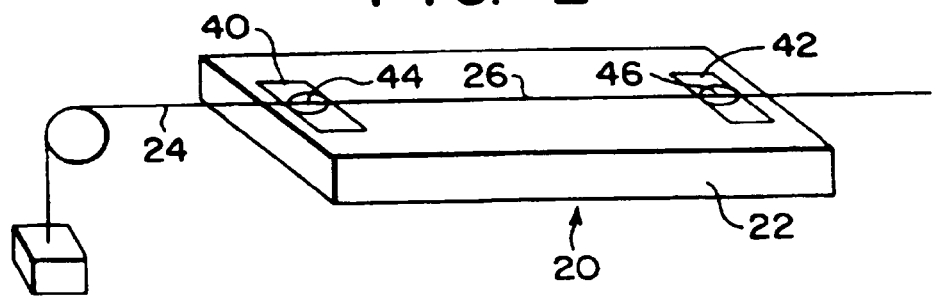
FIG. 2 is a schematic drawing of a second embodiment of an athermal optical fiber grating device.

In another embodiment, FIG. 2, the fiber is not attached directly to the substrate. Bonding pads 40, 42 made from a material differing from the substrate, for example a glass or a ceramic, are attached to the substrate at either end. The fiber 26 is mounted to the pads at points 44, 46. These pads afford better attachment properties of the pad to the fiber than could be achieved from the substrate directly to the fiber because of the large thermal expansion mismatch. Suitable pad materials have a coefficient of thermal expansion intermediate between that of the fiber and the substrate for example between −50 and +5¥$10^{-7}$, preferably about −20¥$10^{-7}$. Alternatively the pad could be a fused silica with a coefficient of expansion closely matching that of the fiber. The pad allows the stress of this joint induced by both the thermal mismatch and the tension of the fiber, to be spread out over a wider area, lessening the chances of cracking and detachment. The attachment materials for the fiber and pad connections are similar to those used for mounting the fiber directly to the substrate, for example, an epoxy cement, an inorganic frit, for example ground glass, ceramic or glass-ceramic material, or a metal.

Figure 3:
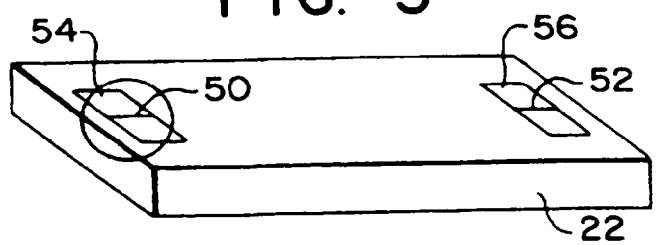
FIG. 3 is a schematic drawing of a third embodiment of an athermal optical fiber grating device.
Figure 4:
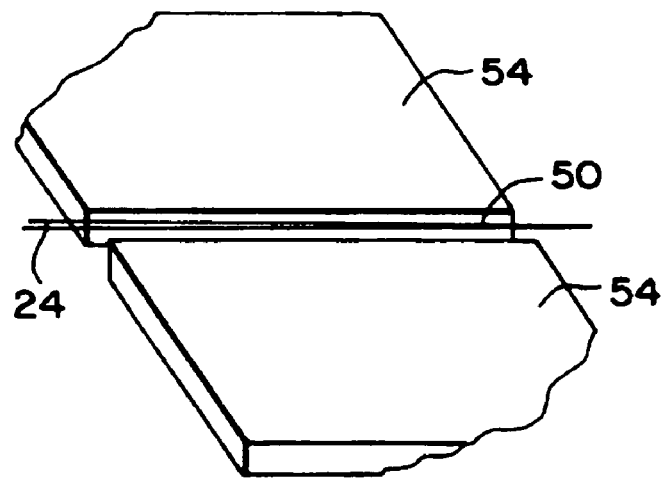
FIG. 4 is an enlarged view of the affixing channel depicted in FIG. 3.

In another embodiment, FIG. 3, the negative expansion of the substrate material 22 is used to create a clamping force on the fiber. The attachment feature, which might be a hole or channel 50, 52 in a raised portion 54, 56 of the substrate, is formed in the substrate at room temperature with a gap that is very slightly smaller than the fiber. Referring to FIG. 4, by lowering the temperature to a point lower than any anticipated use temperature, the substrate expands and allows the insertion of the fiber 24 into the channel 50. Warming of the substrate then causes substrate contraction and creates a clamping force for holding the fiber in the channel.

Figure 5:
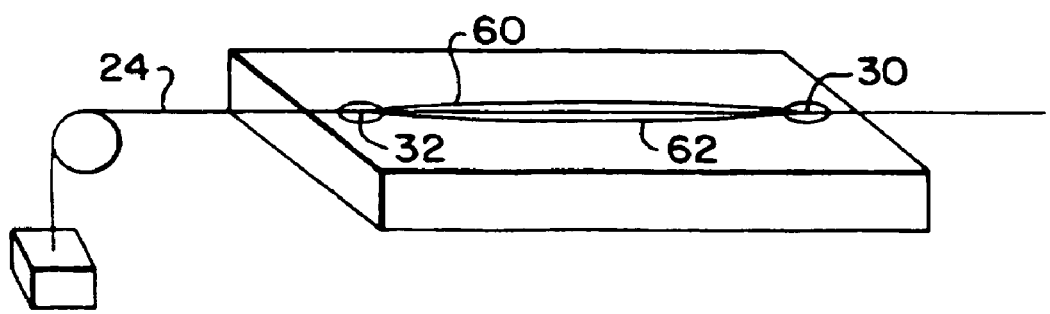
FIG. 5 is a schematic drawing of a fourth embodiment of an athermal optical fiber grating device.

In another embodiment, FIG. 5, the fiber 24 is attached to the substrate at points 30, 32 and the intermediate fiber length 60 is cushioned by a low modulus damping material 62. This low-modulus material, for example a silicone rubber coating surrounding the fiber or a pad of a silicone rubber, a natural or synthetic rubber or mixtures thereof, between the fiber and the substrate protects the fiber reflective grating against external perturbations such as mechanical shock or vibration. Bowing of the fiber is also minimized. In one embodiment the low modulus material is adhesively attached to the fiber and the substrate.

Mounting the fiber under tension will alter the optical properties of the device (for example, the center wavelength of a grating). This can be addressed by biasing the device with a reflective grating written therein to account for the tension, or it can be done by mounting a fiber, for example a germania doped silica fiber, without a reflective grating written therein under tension and then exposing the fiber to UV light in order to fabricate the grating in the device in situ.

In a typical embodiment of the invention the temperature sensitivity of the center wavelength is about 0.0125 nm/° C., the stress sensitivity of the center wavelength is 0.125 nm shift for 9 g of tension, the bare fiber has a diameter of 125 microns, a coated fiber has a diameter of 250 microns. The strength of the fiber is >200 kpsi and therefore has a very high reliability.

Example Of An Athermalized Grating On A Beta-Eucryptite Substrate

Figure 8:
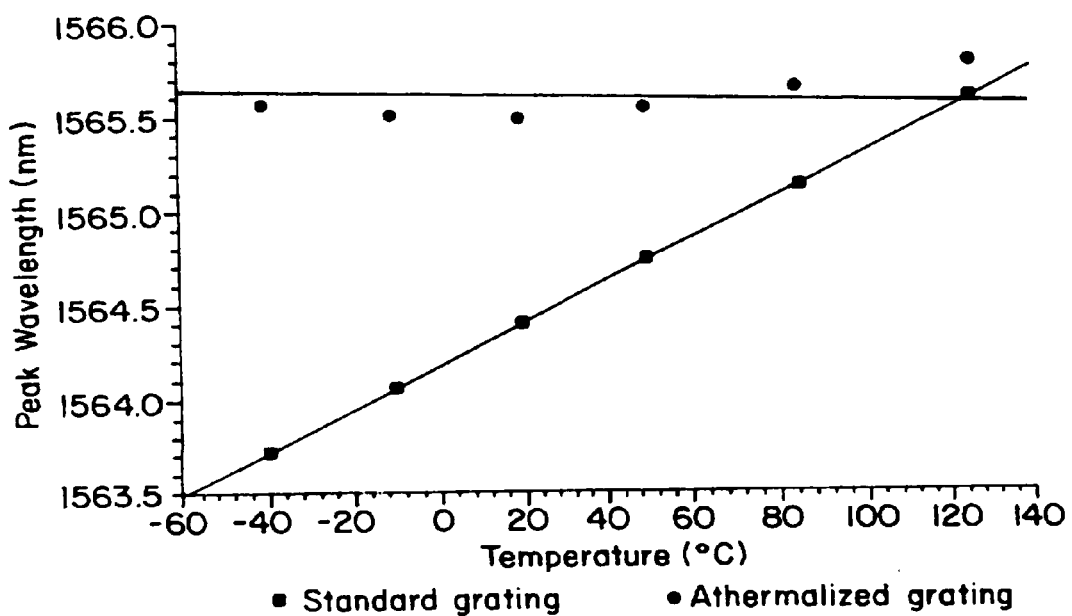
FIG. 8 is a graph of an athermalized grating center wavelength.

The grating was written in a photorefractive-sensitive fiber, Corning SMF-228 fiber, and the fiber was hydrogen loaded at 100 atmospheres in a hydrogen chamber for one week. After removal of the fiber from the hydrogen chamber, a length of approximately 30 mm of coating was removed by mechanical stripping and the fiber was exposed to 240 nm laser irradiation to create the grating. The fiber was then mounted to a substrate of beta-eucryptite, prepared essentially according to the method of Example 2, under a 10 kpsi tension using a UV-curable epoxy adhesive. The assembled grating was heated to 125° C. for 2 hours to out diffuse any remaining hydrogen and to eliminate low stability UV-induced traps. The fiber was thermally cycled between −40° C. and +125° C. A reference fiber was treated in exactly the same way, except it was not attached to a substrate. The grating center wavelength (FIG. 8) varies by approximately 1.9 nm from −40° C. to +125° C. when not attached to the substrate and by only 0.2 nm when attached to the substrate.

Although this invention has been described for UV photo induced gratings it can also be applied to the packaging of other thermally sensitive devices. For instance, optical fiber couplers and optical waveguides could be athermalized by attachment to a negative expansion substrate.

Figure 9:
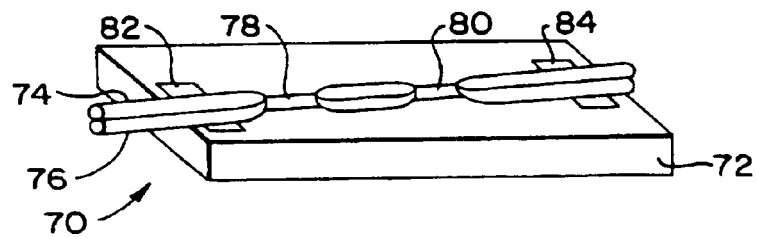
FIG. 9 is a schematic drawing of an embodiment of an athermal optical fiber fused coupler device.

An optical fiber fused coupler has two or more fibers fused together at one or more points along their length and is mounted on a substrate. Such couplers are thermally sensitive which results in a certain amount of thermal instability. Especially sensitive are biconically tapered couplers in which interferometric effects are used, for example a Mach-Zehnder interferometer. Such couplers can be athermalized by mounting the coupler to a negative expansion substrate, such as the beta-eucryptite described in Example 2 above. Referring to FIG. 9 there is illustrated a fused biconical coupler device 70 which includes a negative expansion substrate 72 to which are mounted two fibers 74, 76. The fibers are fused together at regions 78, 80. The fibers are attached to the substrate near the ends at locations 82, 84 in the same manner as described above for the optical fiber reflective grating.

Figure 10:
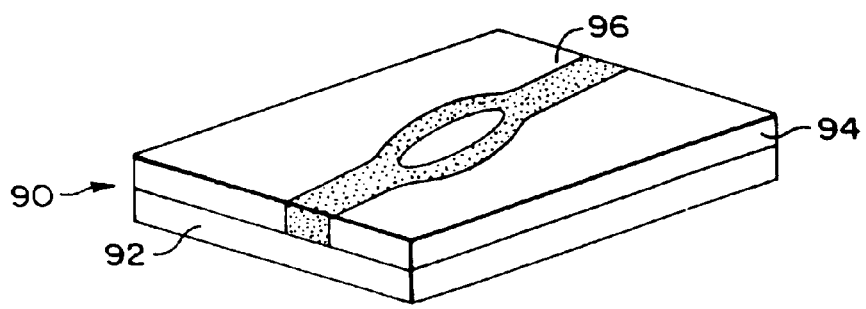
FIG. 10 is a schematic drawing of an embodiment of an athermal planar waveguide device.

Waveguides can be defined, for example, in optical fibers or planar substrates. Such waveguides are thermally sensitive which results in a certain amount of thermal instability. Such waveguides can be athermalized by mounting the waveguide to a negative expansion substrate, such as the beta-eucryptite described in Example 2 above. Referring to FIG. 10, there is illustrated a planar waveguide device 90 which includes a negative expansion substrate 92 on which is adhesively mounted a layer of material 94 in which a planar waveguide 96 is fabricated by methods well known to those skilled in this art. The waveguide material can be, for example, a doped silica such as a germania silicate, other suitable glass compositions, polymers and semiconductors, including semiconductors with gain, such as laser diodes.

The device of this invention is a completely passive system and mechanically simple, and demonstrates athermalization. The method of producing the device is advantageous because it provides temperature compensated optical devices which tolerate shock and vibration and are thermally stable.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. An article comprising an optical fiber with a refractive index grating having a length and a reflection wavelength λ at a given temperature within an operating temperature range; wherein the optical fiber is attached to a support member, said support member having a negative coefficient of thermal expansion selected such that λ is substantially temperature independent over said operating temperature range.

2. An article according to claim 1, wherein the support member has a negative coefficient of thermal expansion selected such that |dλ/dT| is approximately 10% of dλ/dT of an otherwise identical comparison grating that is not attached to a support member.

3. An article according to claim 1, wherein the operating temperature range includes 20° C.

4. An article according to claim 3, wherein the operating range includes at least a portion of the range −20° to 65° C.

5. An article according to claim 1, wherein the optical fiber is a silica-based optical fiber.

6. An article according to claim 1, wherein the optical fiber is attached to the support member at least over the length of the refractive index grating.

7. An article according to claim 1, wherein said optical fiber is attached to the support member at bonding platforms.

8. Article according to claim 7, wherein said bonding platforms are configured such that said refractive index grating is spaced from said support member.

9. Article according to claim 7, wherein said bonding platforms comprise a material selected to have a coefficient of thermal expansion that is substantially matched to the coefficient of thermal expansion of the optical fiber.

10. Article according to claim 7, wherein said support member comprises a first negative thermal expansion coefficient member bonded to a second positive thermal expansion coefficient member, said first and second members selected to provide a support member having a desired value of the negative thermal expansion coefficient.

11. An athermal optical device comprising:
a negative expansion substrate having an upper surface; and
a thermally sensitive, positive expansion optical component affixed to the substrate upper surface at at least two spaced apart locations;
wherein the optical component is an optical fiber grating.

12. An athermal optical fiber grating device comprising:
a negative expansion substrate having an upper surface and first and second ends;
an optical fiber affixed to the substrate upper surface at at least two spaced apart locations; and
a grating defined in the optical fiber between and at a distance from each substrate end;
wherein the substrate provides thermal compensation to the grating.

13. The device according to claim 12, wherein the fiber is affixed by a layer of attachment material.

14. The device according to claim 13, in which the attachment material is one of a polymer, a frit and a metal.

15. The device according to claim 14, in which the polymer is an epoxy adhesive.

16. An athermal optical fiber grating device comprising:
a negative expansion substrate having an upper surface and first and second ends;
an optical fiber affixed to the substrate upper surface at at least two spaced apart locations; and
a grating defined in the optical fiber between and at a distance from each substrate end;
wherein the at least two spaced apart locations comprise first and second spaced apart locations, the first location being between the grating and the first substrate end and the second location being between the grating and the second substrate end.

17. An athermal optical fiber grating device comprising:
a negative expansion substrate having an upper surface and first and second ends;
an optical fiber affixed to the substrate upper surface at at least two spaced apart locations; and
a grating defined in the optical fiber between and at a distance from each substrate end;
wherein:
(a) the at least two spaced apart locations comprise first and second spaced apart locations, the first location being between the grating and the first substrate end and the second location being between the grating and the second substrate end; and
(b) the device further comprises a bonding pad having a coefficient of expansion intermediate between that of the fiber and the substrate mounted between the optical fiber and the substrate at each of the first and second locations, the optical fiber being bonded to each bonding pad and each bonding pad being affixed to the substrate.

18. Apparatus comprising:
(a) a substrate comprising a material having a negative coefficient of thermal expansion; and
(b) a fiber grating affixed to the substrate;
wherein the substrate provides thermal compensation to the fiber grating.

19. In an apparatus having a fiber grating affixed to a device where the device provides thermal compensation to the fiber grating, the improvement wherein the device comprises a material having a negative coefficient of thermal expansion.

* * * * *

UNITED STATES PATENT AND TRADEMARK OFFICE
CERTIFICATE OF CORRECTION

PATENT NO. : 7,254,297 B1  
APPLICATION NO. : 09/203166  
DATED : August 7, 2007  
INVENTOR(S) : George Halsey Beall et al.

Page 1 of 1

It is certified that error appears in the above-identified patent and that said Letters Patent is hereby corrected as shown below:

| No. | Col. | Line | Description |
| --- | --- | --- | --- |
| 1 | 9 | 34 | After the sentence "wherein the optical component is an optical fiber grating" add --and the negative expansion substrate is selected to provide thermal compensation to the thermally sensitive, positive expansion optical component.-- |
| 2 | 10 | 45 | After "expansion" add --, said material being selected so that the device provides thermal compensation to the fiber grating.-- |

Signed and Sealed this

Twenty-seventh Day of May, 2008

JON W. DUDAS  
*Director of the United States Patent and Trademark Office*